May 22, 1962     B. W. CARTWRIGHT     3,035,457
HYDRODYNAMIC TRANSMISSION
Filed March 31, 1958     2 Sheets-Sheet 1
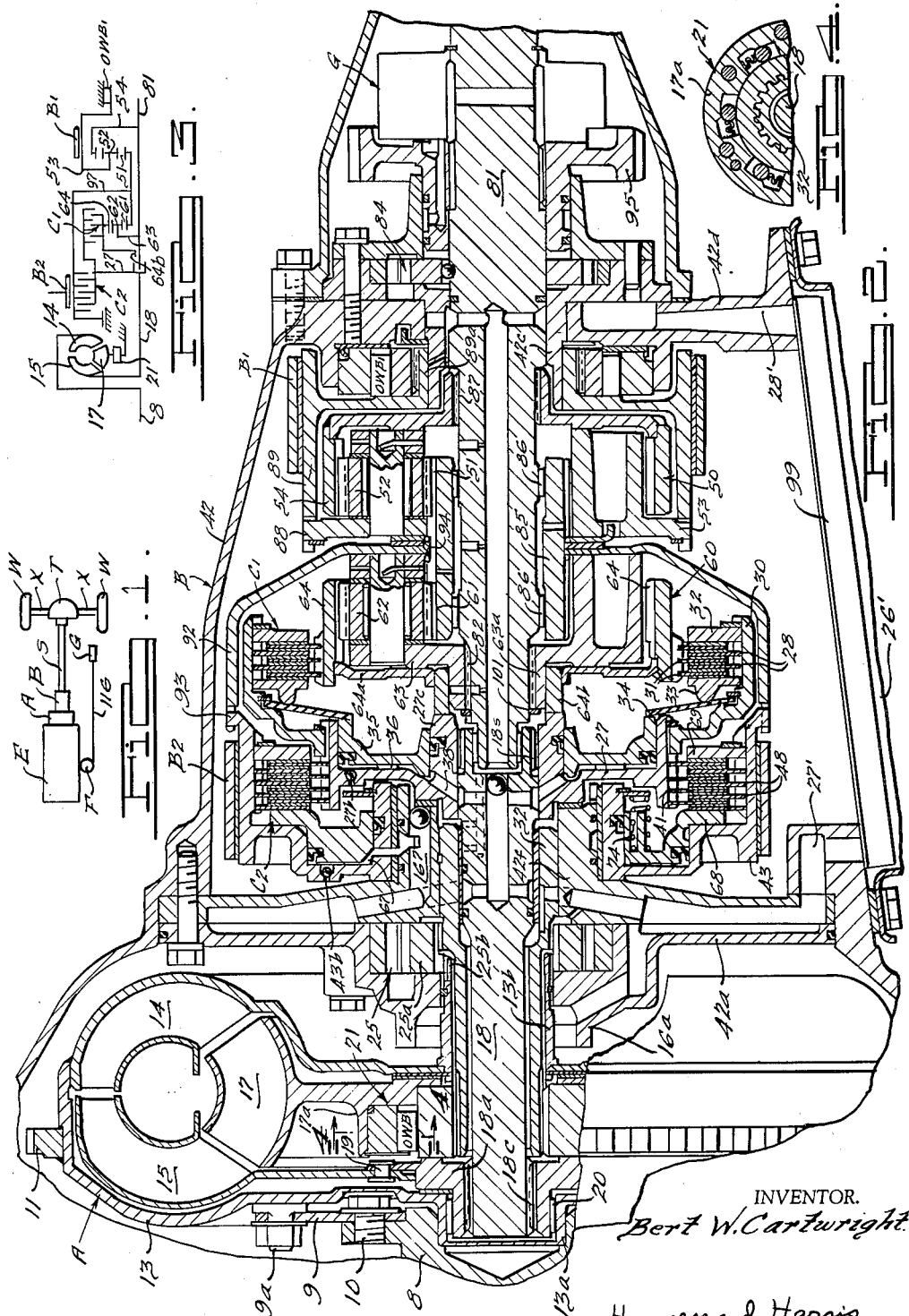
INVENTOR.
Bert W. Cartwright.
BY Harness and Harris
ATTORNEYS.

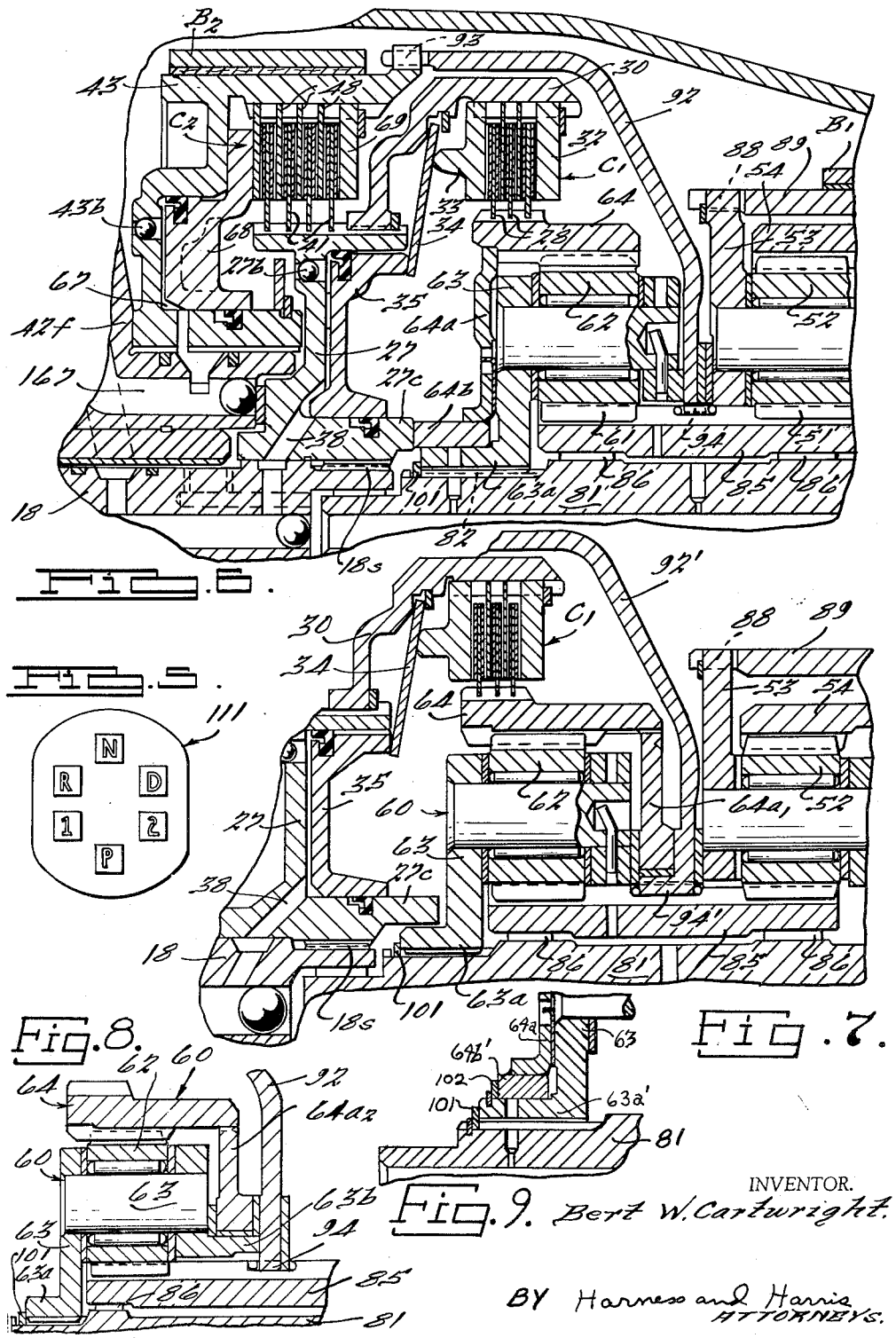

United States Patent Office 3,035,457
Patented May 22, 1962

3,035,457
HYDRODYNAMIC TRANSMISSION
Bert W. Cartwright, East Detroit, Mich., assignor to Chrysler Corporation, Highland Park, Mich., a corporation of Delaware
Filed Mar. 31, 1958, Ser. No. 725,307
3 Claims. (Cl. 74—730)

This invention relates to a power transmission unit primarily intended for motor vehicle use and is particularly concerned with a transmission of the most simplified, compact, type that will function to automatically provide three (3) different forward drive speeds and also a reverse drive.

It is a primary object of this invention to provide a three forward speeds and reverse drive motor vehicle transmission that utilizes the minimum number and the least complicated transmission elements with said elements arranged in a novel compact manner so as to provide the most favorable construction for a forwardly positioned transmission in a motor vehicle having the minimum road clearance and the minimum allowance for a drive shaft tunnel in the vehicle body floor.

It is another object of this invention to provide a simplified three forward speeds and reverse drive transmission adapted for automatic and manual control that utilizes a pair of simple planetary gear sets in combination with a one-way brake and a pair of friction clutches and an expanded hydraulic torque converter.

It is still another object of this invention to provide a power transmission unit of the aforementioned type wherein portions of the gearing are nested concentrically within at least one of the friction clutch assemblies to permit reduction in overall length of the power transmission unit.

It is still another object of this invention to arrange the elements of the planetary gear trains such that bearing and thrust loads will be reduced to a minimum and thereby achieve the maximum simplicity and economy of parts.

Other objects and advantages of this invention will become readily apparent from a consideration of the subsequent description and the related drawings wherein:

FIG. 1 is a schematic view of a motor vehicle drive train that includes a power transmission unit embodying this invention;

FIG. 2 is a sectional elevational view of the power transmission unit utilized in the disclosed drive train of FIG. 1;

FIG. 3 is a schematic line diagram of the power transmission unit shown in FIG. 2;

FIG. 4 is an enlarged, fragmentary, sectional elevational view of the one-way brake mechanism associated with the guide wheel of the drive train torque converter device, the view being taken on the line 4—4 of FIG. 2;

FIG. 5 is a diagrammatic view of the push-button operated controls for the transmission shown in FIG. 2;

FIG. 6 is an enlarged, fragmentary, sectional elevational view of the forward end, friction clutch receiving portion, of the gear box shown in FIG. 2;

FIG. 7 is another enlarged, fragmentary, sectional elevational view of a modified form of the invention shown in FIGS. 2 and 6;

FIG. 8 is another fragmentary elevational view, similar to FIGS. 6 and 7, showing still another modified form of this invention; and FIG. 9 is still another modified form of the invention shown in FIG. 6.

FIG. 1 of the drawings diagrammatically discloses a motor vehicle power plant and drive train comprising an internal combustion engine E drivingly connected to a power transmission unit that consists of the hydrokinetic type of torque converter device A drivingly connected to a change speed gear box B. The output from gear box B drives a propeller shaft or drive shaft S that transmits drive through a differential unit T and axles X to the rear driving wheels W of the vehicle.

FIG. 2 of the drawings discloses the power transmission unit structure that consists of the expanded hydrokinetic torque converter device A and the change speed gear box B that are arranged in a series connected drive transmitting relationship. The reference numeral 8 represents an end portion of a driving member, such as the crankshaft of the engine E of the motor vehicle power plant. The shaft 8 is drivingly connected to the drive transmitting ring 9 by the screw means 10. The drive transmitting ring 9 is drivingly connected by bolts 9a to the torque converter casing 13. The converter casing 13 has an engine starter ring gear 11 mounted on and extending about its periphery. Within the torque converter casing 13 are mounted the several vaned converter wheel elements, namely, the impeller or pump member 14, the turbine or runner member 15, and the guide or reaction member 17. A pair of guide wheels may be used in place of the single guide wheel 17.

The vaned impeller wheel 14 is formed as an integral part of the converter casing 13 and is accordingly adapted to be rotatably driven by the driving shaft 8. The vaned turbine wheel 15 is drivingly connected by rivet means 19 to a radially extending flange portion formed on the shaft hub member 18a of shaft 18. Shaft hub member 18a is drivingly connected by splines 18c to the forward end portion of the torque converter driven shaft member 18.

By the use of an expanded torque converter A, wherein the rotor wheel vane portions are positioned radially outwardly at increased radial distances, it has been found that the same amount of torque conversion and multiplication can be obtained with a smaller size wheel blade portion as is obtained with a much larger size rotor wheel blade portion that is located closer to the rotational axis of the rotor wheels. Because smaller size rotor wheel blading can be used with an expanded converter, the axial length of the converter A can be materially reduced and thus the overall length of the transmission unit is shortened. Furthermore, with an expanded converter the one-way brake device 21 for the converter stator wheel 17 as well as the housing 16a for the engine-driven front pump 25 may be nested within the hub area of the expanded rotor wheels 14, 15, 17 and this permits a further axial shortening of the transmission power unit herein disclosed.

The converter driven shaft member 18 is adapted to transmit drive from the turbine member 15 of the torque converter device A to the planetary gearing of the gear box unit B that is arranged rearwardly of and in series with the torque converter device A. The converter driven shaft 18 thus provides the input shaft to the gear box B. The forward end of shaft 18 is journalled in a bearing 20 that is piloted in an axially extending seat 13a formed in the hub of the torque converter casing 13. The rear end portion of converter driven shaft 18 is rotatably supported by the sleeve 32 that is carried by the front wall 42a of the gear box housing 42.

The vaned converter guide wheel 17 is rotatably mounted within the converter casing 13 by means of the guide wheel hub portion 17a. Guide wheel hub portion 17a is supported by means of the one-way brake device 21, on the axially extending sleeve 32 of the housing portion plate 42a. The one-way brake 21 (see FIG. 4) is arranged such that it will permit only forward rotary movement (clockwise when looking from the converter A towards the gear box B) to be transmitted to the guide wheel 17 by the forward rotation of the impeller 14. The brake 21 continuously prevents rotation of the guide wheel 17 in a reverse or counterclockwise direction. The specific one-way brake 21 herein disclosed is shown in section in FIG. 4.

The torque converter unit A includes a gear type oil pump 25 having a driving gear 25a that is directly connected by key means 25b to the rearwardly projecting end of an axially extending, sleevelike, flange portion 13b of the rotatable converter casing 13. The pump 25 draws oil from a supply sump 26' through supply conduit 27' and circulates this oil through the converter A, the transmission unit lubricating system and the various hydraulically operated control mechanisms associated with this power transmission unit (not shown). A second pump 84, driven by the transmission output shaft 81, is also included in this transmission unit. The second pump 84 provides a second source of pressure fluid for operation of the various aforementioned hydraulically operated devices and insures a pressure fluid supply even at times when the engine driven pump 25 might not be operating. Pump 84 will thus provide pressurized fluid during pushed or towed starting as well as during engine driven operation of the vehicle. Pump 84 is connected to the oil supply sump 26' by the conduit 28'.

The gear box B includes the forward drive clutch $C_1$, the direct drive clutch $C_2$, and the pair of planetary gear trains 50 and 60 that are adapted to cooperate with the torque converter device A to provide means for the transmission of three forward drives and a reverse drive to the propeller shaft S. The forward drive clutch $C_1$ is engaged whenever any of the three forward speeds is being utilized and it is disengaged when the transmission controls are set for either Neutral or Reverse. The direct drive clutch $C_2$ is engaged only when the 3rd or Direct forward speed is being transmitted or when Reverse drive is being transmitted. The different clutches and brakes that are applied for transmitting the several drive ratios obtainable with this transmission are set forth in the chart below.

Drive ratio: | Members applied
--- | ---
Low (1st) | $C_1$ and $B_1$ or $O.W.B._1$.
Kickdown (2nd) | $C_1$ and $B_2$.
Direct (3rd) | $C_1$ and $C_2$.
Reverse | $C_2$ and $B_1$.

The gear box B includes the housing 42 which may be considered to include front and rear portions. In the front portion of the housing 42 are located the clutches $C_1$ and $C_2$ whereas the rear portion houses the two planetary gear sets 50 and 60. The rear end of the converter driven gear box input shaft 18 pilots the forward end of the gear box output shaft 81. Output shaft 81 has its rear end portion journaled in the sleeve portion 42c of the transmission housing rear wall 42d. Transmission input shaft 18 is drivingly connected at 18s to a spider element 27. The spider element 27 carries the friction clutch disc elements 41 of the reverse and direct drive clutch $C_2$. Clutch discs 41 are adapted to be drivingly engaged with the clutch discs 48 that are drivingly connected to the interior surfaces of the brake drum 43. Brake drum 43 is journaled on the rearwardly projecting collar 42f on the gear box housing front wall 42a. A brake band $B_2$ is arranged to be selectively applied to the brake drum 43 to prevent rotation thereof. Brake drum 43 mounts a backing plate 69 that cooperates with an axially shiftable piston 68 to effect drive transmitting engagement of the clutch discs 41, 48. Springs 74 normally urge the piston 68 forwardly to clutch disengaged position. Brake drum 43 may include a ball check pressure fluid bleed valve 43b that is speed responsive and arranged to prevent unintended engagement of the clutch $C_2$ by the centrifugal action of any fluid that may be trapped in the piston bore 67. Pressure fluid for operation of the clutch $C_2$ is supplied to the piston bore 67 through the conduit 167 that is connected to a suitable fluid pressure control valve not shown.

Also drivingly mounted on the spider 27, and extending rearwardly therefrom, is a clutch drum 30. Clutch drum 30 has drivingly and shiftably mounted on its interior face the friction clutch discs 28. Clutch discs 28 are arranged to be drivingly engaged with the clutch discs 31 that are carried by the exterior surface of the annular gear 64 of the forwardly arranged planetary gear set 60. Clutch discs 28 and 31 are arranged to be drivingly compressed against the backing plate 32 by the pressure plate 33 that is actuated by the lever spring plate 34. Lever spring plate 34 is operated by the piston 35 that reciprocates in a cylinder bore 36 formed in the rear side of the spider 27. Pressure fluid is supplied to the cylinder bore 36 by way of the conduit 38 that is connected to a pressure fluid control valve not shown. The spider 27 may mount a pressure fluid ball check bleed valve 27b that will prevent unintended engagement of the clutch $C_1$ by centrifugal force action on any fluid that might be trapped in the cylinder bore 36.

Arranged concentrically within the forward drive clutch $C_1$ is the forwardly located planetary gear set 60. This gear set 60 comprises the annulus gear 64, the sun gear 61, the planet pinion gearing 62 connecting gears 61, 64, and the planet pinion gear carrier 63 that rotatably supports the pinion gearing. Pinion gearing carrier 63 is splined to the output shaft 81 at 82. Annulus gear 64 is supported through its radially extending plate portion 64a on a hub portion 64b that is journaled on the hub 63a of the planet pinion gear carrier 63. The forward end of the hub portion 64b of the annulus gear 64 can react against the rear end of the hub portion 27c of spider 27. The sun gear 61 is an integral part of the double sun gear sleeve 85. Sleeve 85 has the sun gear 61 formed on the front end thereof and the sun gear 51 of planetary gear set 50 is formed on the rear end thereof. Sun gear sleeve 85 is journaled on the output shaft 81 by means of sleeve bearings 86.

The rearwardly located gear set 50 includes the sun gear 51, the annulus gear 54, the planet pinion gearing 52 that connects the gears 51, 54, and the planet pinion gear carrier 53 that rotatably supports the pinion gearing 52. Annulus gear 54 is drivingly connected to the output shaft 81 by the splines 87. Pinion gear carrier 53 is drivingly connected at 88 to a brake drum 89 that is adapted to be engaged by the brake band $B_1$. Brake drum 89 has a hub portion 89a that is journaled on the forwardly projecting collar 42c of the rear wall 42d of the transmission housing 42. Hub portion 89a of the annulus gear 89 is restrained against reverse rotation, counterclockwise when looking from the front towards the rear of the transmission, by means of the one-way brake device $O.W.B._1$ which is similar to the brake device shown in FIG. 4.

Interconnection between the two axially spaced adjacent gear sets 50, 60 is by way of the common sun gear sleeve 85 and by way of the dual connections of the front carrier 63 and the rear annulus gear 54 to the common output shaft 81.

It will be noted that a particularly compact, relatively short, power transmission unit is provided because of the concentric arrangement of the front planetary gear set within the forward drive clutch $C_1$. Because of this concentric arrangement it is also possible to use a relatively short drum connector 92 between the front brake drum 43 and the sun gear sleeve 85. Connector drum 92 is splined to the drum 43 at 93 and to the sun gear sleeve 85 at 94. Drum connector 92 is the means whereby the sun gears 51, 61 can be anchored against rotation when brake band $B_2$ is applied to brake drum 43.

Mounted on the rear end of the output shaft 81 is rear oil pump 84 and a sprag gear 95 that is adapted to be engaged by a parking sprag not shown. Also mounted on the rear end of the output shaft 81 is the hydraulic governor device G that is a part of the transmission control system. This governor device may be of the type shown in U.S. Patent 2,697,363 to W. L. Sheppard.

It is thought to be obvious that the valve body 99 that includes the several fluid control mechanisms for this automatic type of three forward speeds and reverse drive transmission will be mounted in the transmission housing oil sump 26'. This location makes it easy to adjust, repair, or replace the valve body 99 and it also permits foreshortening of the transmission length.

With the aforedescribed gear box when the transmission is set in Neutral by depression of the N pushbutton shown in FIG. 5, the hydraulic control system not shown prevents the application of pressurized fluid to either of the clutches $C_1$ or $C_2$ or to either of the servos not shown that are used to apply the braking bands $B_1$ and $B_2$. When clutch $C_1$ is disengaged, the torque converter-driven, gear box input shaft 18 is disconnected from the gear box gear set 60 so there can be no input to the gearing 50, 60 through ring gear 64. When the clutch $C_2$ is disengaged there can be no drive input to either of the gear sets 50, 60 through the sun gears 51, 61 of the gear sets.

When the drive ratio selector pushbuttons (see FIG. 5) are set for the initiation of drive in the Drive ratio, by depression of pushbutton D, the forward drive clutch $C_1$ is automatically engaged and this transmits drive to the gear box planetary input gear 64. Neither of the braking bands $B_1$ or $B_2$ nor the clutch $C_2$ is engaged at this time. The one-way brake $O.W.B._1$ prevents reverse rotation of the carrier 53 at this time and this one-way brake device provides the reaction for the compounded gear sets 50 and 60 which cooperate to transmit the one-way Low or first speed forward drive to the gear box output shaft 81. This Low speed drive passes from the input shaft 18 through the engaged clutch $C_1$ and then to the ring gear 64. Ring gear 64 acts on the planet pinion gears 63 and causes rotation of the sun gear 61 backwards because the load on the output shaft 81 tends to anchor the planet pinion carrier 63 against rotation. Rotation of sun gear 61 backwards rotates the sleeve 85 and the sun gear 51 backwards. The sun gear 51 rotating backwards acts on the planet pinions 52 and tends to rotate the pinion gear carrier 53 backwards because of the output shaft load on the ring gear 54. Due to the one-way brake device $O.W.B._1$ the carrier 53 can not be rotated backwards and the pinion gears 52 are then active to drive the ring gear 54 and connected output shaft 81 forwardly. Due to the connection of both the carrier 63 and the ring gear 54 to the output shaft 81 and due to the anchoring of carrier 53 by brake $O.W.B._1$ at this time, part of the torque of the input shaft 18 is transmitted directly to the output shaft 81 by the planetary gear set 60 and the other part of the input shaft torque is delivered to the output shaft 81 through the compounded gear sets 50 and 60. The starting Low drive when the transmission is set for Drive, or any other forward drive ratio for that matter, thus passes through both of the gear sets 50 and 60 with the reaction normally provided by the one-way brake device $O.W.B._1$.

When Second speed is to be attained by an upshift from the starting Low, it is merely necessary to apply braking band $B_2$ while the forward drive clutch $C_1$ remains engaged. This anchors the rotatable sleeve 85 that carries the sun gears 51 and 61. With sun gear 61 anchored the planetary gear set 60 is activated to directly transmit a two-way forward Second speed drive from ring gear 64 to pinions 62 to the output shaft 81 by way of the carrier 63. Planetary gear set 50 is inactive at this time and its pinion gear carrier 53 is driven forwardly at a speed which causes it to lift off and to overrun the one-way brake device $O.W.B._1$. Braking band $B_1$ and clutch $C_2$ remain disengaged when the transmission is conditioned for Second speed forward drive. It will be noted that no braking band need be released on an upshift from Low to Second because the Second speed can lift off the one-way brake $O.W.B._1$ when band $B_2$ is applied to activate Second speed and likewise no braking band need be applied on an automatic downshift from Second to Low for the drive can drop down on to the one-way brake device $O.W.B._1$ as the band $B_2$ is released.

Third forward speed or direct drive is achieved by an upshift from second that results from the engagement of the direct drive clutch $C_2$ at the release of band $B_2$. The forward drive clutch $C_1$ remains engaged when in Third forward speed while bands $B_1$ and $B_2$ are each released. Engagement of clutch $C_2$ while cluch $C_1$ is engaged connects the ring gear 64 and the sun gear 61 of the planetary gear set 60 and this locks up the gear set 60 for the transmission of a direct 1:1 forward drive. Locking up gear set 60 also locks up gear set 50 because of the interconnection between the several elements of these two gear sets.

Reverse drive is obtained by depressing pushbutton R (FIG. 5). This action engages the clutch $C_2$ and applies the brake band B while the clutch $C_1$ is disengaged and the braking band $B_2$ is released. With cluch $C_1$ disengaged there is no drive input to the ring gear 64. Drive input is from the input shaft 18 through the clutch $C_2$ and drum 92 to the sun gear 51. As braking band $B_1$ is applied the carrier 53 is anchored and the output shaft mounted ring gear 54 is driven in a backwards or reverse direction by the gear set 50. Planetary 50 is thus effective to transmit the Reverse drive.

For a coasting low speed ratio, for use as a brake or for continuous low speed operation, the braking band $B_1$ can be applied at the same time that the one-way brake $O.W.B._1$ and the forward drive cluch $C_1$ are engaged. Depression of the low pushbutton "I" (see FIG. 5) will produce an effective coast brake ratio in the transmission. The one-way brake $O.W.B._1$ cannot be relied on for a coast brake in Low speed because it would permit carrier 53 to overrun at certain vehicle speeds.

For a coasting second speed ratio, for use as a coast brake, or for limiting the transmission to an automatic two-speed operation, or for effecting a downshift to Second speed drive from the Third speed or direct drive, the "2" pushbutton may be depressed. The actual effect on the various control system mechanisms will depend on the transmission condition of operation at the time the "2" pushbutton is depressed. The "2" pushbutton thus provides a means for readily overruling the automatic controls that normally control the transmission when the "2" or Drive pushbutton is depressed.

The control system for this transmission includes a manually operable drive ratio selector means 111 (FIG. 5) which in this instance is a pushbutton mechanism such as that shown in the co-pending application of H. E. Scharfenberg, Serial No. 596,529, filed July 9, 1956, now Patent No. 2,989,958. The pushbutton P shown in control 111 is adapted to operate a parking sprag that engages the sprag gear 95. The remainder of the control system may be of the hydraulic type shown in the co-pending application of Leonard E. Froslie, Serial No. 640,804, filed February 18, 1957, now Patent No. 3,000,-230.

From FIG. 6 it is clearly seen that forwardly directed gear thrust from the front annulus gear 64 will be transmitted by the annulus gear hub portion 64b to the rear end 27c of the input shaft mounted spider element 27. FIGS. 7 and 8 each show modified forms of this invention wherein a rearrangement of the location of the radially extending support plate $64a_1$ or $64a_2$ of the front annulus gear 64 provides an improved gear thrust arrangement over the arrangement shown in FIG. 6. Obviously either of the arrangements shown in FIGS. 7 and 8 can be used in place of the FIG. 6 construction.

In FIG. 7 the front annulus gear support plate 64a has been moved from the front to the rear of the gear and the plate 64a is now journaled on the axially extending hub portion 94' of the connector drum 92'. It will also be noted that in this form of the invention the hub portion 63a of the planet pinion carrier 63 is splined to the output shaft 81 and fixed against forward axial movement by the snap ring 101. With the FIG. 7 construction any forwardly directed thrust forces developed in the front planetary gear set 60 will be applied to the output shaft 81 through the snap ring 101 and there will not be an application of forwardly directed thrust to the portion 27c of the input shaft mounted spider element 27. The restriction of the forwardly directed gear set thrust loads to the output shaft improves the wear life of certain of the bearings and elements shown in the FIG. 6 arrangement.

The FIG. 8 form of this invention shows another design whereby the forwardly directed, axially extending, gear set thrust forces are applied to only the output shaft 81 and are not transmitted to the input shaft 18 or the members carried thereby. In FIG. 8 the drum connector 92 is connected to the sun gear sleeve 85 at 94 in the same manner as shown in FIG. 6. The annulus gear 64 has a rearwardly located support plate 64a₂ that is journaled on the axially extending flange portion 63b of the planet pinion gear carrier 63. In FIG. 8 the hub portion 63a of the carrier 63 is connected to the splines on the output shaft 81 and locked against forwardly directed axial movement by the snap ring 101. The FIG. 8 arrangement, like FIG. 7, reduces the thrust loads that are applied to the input shaft 18 and the elements carried thereby.

In FIG. 9 is shown a modified form of the invention wherein the forwardly directed axial gear thrust of the planetary gear trains is applied to the output shaft 81 and is not transmitted to the input shaft 18. It will be noted that the hub 64b' of the ring gear 64 is journaled on and anchored to the hub 63a' of the pinion gear carrier 63. Because the snap ring 102 anchors the ring gear 64 to the hub 63a' of the carrier 63 any forwardly directed axial gear thrust of ring gear 64 is applied to the output shaft 81 and is not transmitted to the input shaft 18 or any elements mounted thereon. As is clearly shown in FIGS. 6–9, the hub portion 63a or 63a' of the pinion gear carrier 63 is anchored to the output shaft 81 by the snap ring 101 so that forwardly directed, axial gear thrust forces applied to the carrier 63 will be directly applied to the output shaft 81.

I claim:

1. A variable speed power transmission unit comprising a casing journaling a pair of axially aligned input and output shafts, a clutch spider element carried by said input shaft mounting friction clutch portions of a pair of axially spaced first and second friction clutch devices, a pair of axially spaced planetary gear sets mounted on and anchored against axial shaft along said output shaft so as to be held out of contact with said input shaft, each gear set comprising concentrically arranged, rotatable, intermeshed, sun, ring and planet pinion gears wherein the planet gears are rotatably mounted on a planet pinion gear carrier, the forwardmost of said gear sets being concentrically arranged within the friction clutch portions of one of said clutch devices and having friction clutch portions on the periphery of its ring gear engageable with the concentrically arranged, spider mounted, friction clutch portions of said one clutch device, said forwardmost gear set being mounted on said output shaft by means preventing the transfer of thrust forces from the gearing thereof to said input shaft, a first brake means arranged to anchor the carrier of the rearmost gear set against rotation in at least one direction, means drivingly interconnecting the sun gears of the two gear sets, means drivingly connecting the carrier of the forwardmost gear set and the ring gear of the rearmost gear set to the output shaft, a second brake means mounting friction clutch portions engageable with the spider mounted friction clutch portions of the other of said clutch devices, said second brake means having drive transmitting portions connected to the sun gears of the planetary gear sets and being adapted to anchor said sun gears against rotation in either direction.

2. In a variable speed transmission as set forth in claim 1 wherein the second brake means drive transmitting portions provide journal means for the ring gear of the forwardmost gear set.

3. In a variable speed transmission as set forth in claim 1 wherein the pinion gear carrier of the forwardmost gear set provides journal means for the associated ring gear.

References Cited in the file of this patent
UNITED STATES PATENTS

| | | |
|---|---|---|
| 2,518,824 | Simpson | Aug. 15, 1950 |
| 2,576,336 | Farkas | Nov. 27, 1951 |
| 2,590,280 | Swift | Mar. 25, 1952 |
| 2,682,177 | Kelbel | June 29, 1954 |
| 2,813,437 | Kelbel | Nov. 19, 1957 |
| 2,815,684 | Roche | Dec. 10, 1957 |
| 2,855,803 | Knowles | Oct. 14, 1958 |
| 2,856,794 | Simpson | Oct. 21, 1958 |
| 2,917,951 | Aschauer | Dec. 22, 1959 |

UNITED STATES PATENT OFFICE
CERTIFICATE OF CORRECTION

Patent No. 3,035,457                                 May 22, 1962

Bert W. Cartwright

It is hereby certified that error appears in the above numbered patent requiring correction and that the said Letters Patent should read as corrected below.

Column 8, line 4, for "shaft", first occurrence, read -- shift --.

Signed and sealed this 2nd day of October 1962.

(SEAL)
Attest:

ERNEST W. SWIDER
Attesting Officer

DAVID L. LADD
Commissioner of Patents